(12) United States Patent
Nakanishi et al.

(10) Patent No.: US 7,351,496 B2
(45) Date of Patent: Apr. 1, 2008

(54) BATTERY

(75) Inventors: Naoya Nakanishi, Kobe (JP); Kouichi Satoh, Kobe (JP); Atsuhiro Funahashi, Toyonaka (JP); Toshiyuki Nohma, Kobe (JP)

(73) Assignee: Sanyo Electric Co., Ltd., Osaka (JP)

( * ) Notice: Subject to any disclaimer, the term of this patent is extended or adjusted under 35 U.S.C. 154(b) by 567 days.

(21) Appl. No.: 10/633,419

(22) Filed: Aug. 4, 2003

(65) Prior Publication Data

US 2004/0023108 A1 Feb. 5, 2004

(30) Foreign Application Priority Data

Aug. 5, 2002 (JP) ............... 2002-226838

(51) Int. Cl.
*H01M 2/02* (2006.01)
*H01M 2/30* (2006.01)

(52) U.S. Cl. .............. 429/164; 429/157; 429/176; 429/178

(58) Field of Classification Search ............. None
See application file for complete search history.

(56) References Cited

U.S. PATENT DOCUMENTS

| 6,531,246 | B2* | 3/2003 | Hanafusa et al. ........ 429/162 |
|---|---|---|---|
| 6,632,538 | B1* | 10/2003 | Yamazaki et al. ........ 428/461 |
| 7,008,720 | B2* | 3/2006 | Shimamura et al. ...... 429/179 |
| 2002/0146621 | A1* | 10/2002 | Yageta et al. ........... 429/181 |
| 2003/0027039 | A1* | 2/2003 | Benson et al. .......... 429/158 |

FOREIGN PATENT DOCUMENTS

| JP | 04-249072 A | 4/1992 |
|---|---|---|
| JP | 09-073885 A | 3/1997 |
| JP | 10-233233 A | 9/1998 |
| JP | 2000-100416 A | 4/2000 |
| JP | 2001-76706 A | 3/2001 |
| JP | 2002-270148 A | 9/2002 |

* cited by examiner

*Primary Examiner*—Jonathan Crepeau
(74) *Attorney, Agent, or Firm*—Kubovcik & Kubovcik

(57) ABSTRACT

A battery including an electrode unit which is an electricity generating element housed in a battery can, in which the electricity can be taken out of the can via a pair of negative and positive electrode terminals which are exposed outside the can, and one of the negative and positive electrode terminals has a coating layer formed on a surface thereof that is the same material as the material of which the other of the negative and positive electrode terminals is made.

7 Claims, 12 Drawing Sheets

BATTERY

FIELD OF THE INVENTION

The present invention relates to a battery such as a lithium ion secondary battery in which an electrode unit which is an electricity generating element is housed in a battery can, and electricity generated by the electrode can be taken out from the can.

BACKGROUND OF THE INVENTION

A lithium ion secondary battery having a high energy density has recently received attention as a power source for portable electronic equipment, electric vehicles, and the like. A cylindrical lithium ion secondary battery, as shown in FIG. 13, includes a spirally wound, or rolled-up, electrode (2) housed in a positive electrode can (1), and a sealing plate (11) fixed on an opening of the positive electrode can (1). An insulator (12) is placed between the positive electrode can (1) and the sealing plate (11). A negative electrode terminal (13) having a built-in gas vent valve (14) is connected to the sealing plate (11).

The spirally wound electrode (2) comprises a negative electrode (21), separator (22) and positive electrode (23), each in the form of a strip. The negative electrode (21) and the positive electrode (23) are shifted widthwise of the separator when they are placed on the separator (22) to be spirally wound. An edge of the negative electrode (21) projects outwardly beyond an edge of separator (22) at one axial end of the spiral electrode (2), and an edge of the positive electrode (23) projects outwardly beyond an edge of the separator (22) at the other axial end of the spirally wound electrode (2). Current collectors (3) are placed on both ends of the spirally wound electrode (2). The current collector (3) on the negative electrode side is welded through a tab (31) onto a back of the sealing plate (11), and the current collector (3) on the positive electrode side is welded onto the bottom of the positive electrode can (1) through a tab (31). This structure makes it possible to take out electricity generated by the spirally wound electrode (2) via a negative electrode terminal (13) and the positive electrode can (1). The negative electrode terminal (13) is made of nickel, copper or stainless steel that is stable at a negative electrode potential. The positive electrode can (1) is made of aluminum or aluminum alloy that is stable at a positive electrode potential.

However, when conventional lithium ion secondary batteries, batteries A and B, are connected in series as shown in FIG. 14, for example, a negative electrode terminal (13b) made of nickel and a positive electrode can (1a) made of aluminum contact each other. There is a problem that the contacting of different metals for a long period causes electrical corrosion at the contacted portion and causes an increase in contact resistance.

OBJECT OF THE INVENTION

An object of the present invention is to provide a battery free from electrical corrosion even when the batteries are connected in series for a long period of time.

SUMMARY OF THE INVENTION

The battery of the present invention includes an electrode unit which is an electricity generating element housed in a battery can, in which the power can be taken out of the can via a pair of negative and positive electrode terminals which are exposed outside the can, wherein a coating layer comprising the same material as that of which one of the electrode terminals is comprised is formed on a surface of the other electrode terminal.

Figure 1:
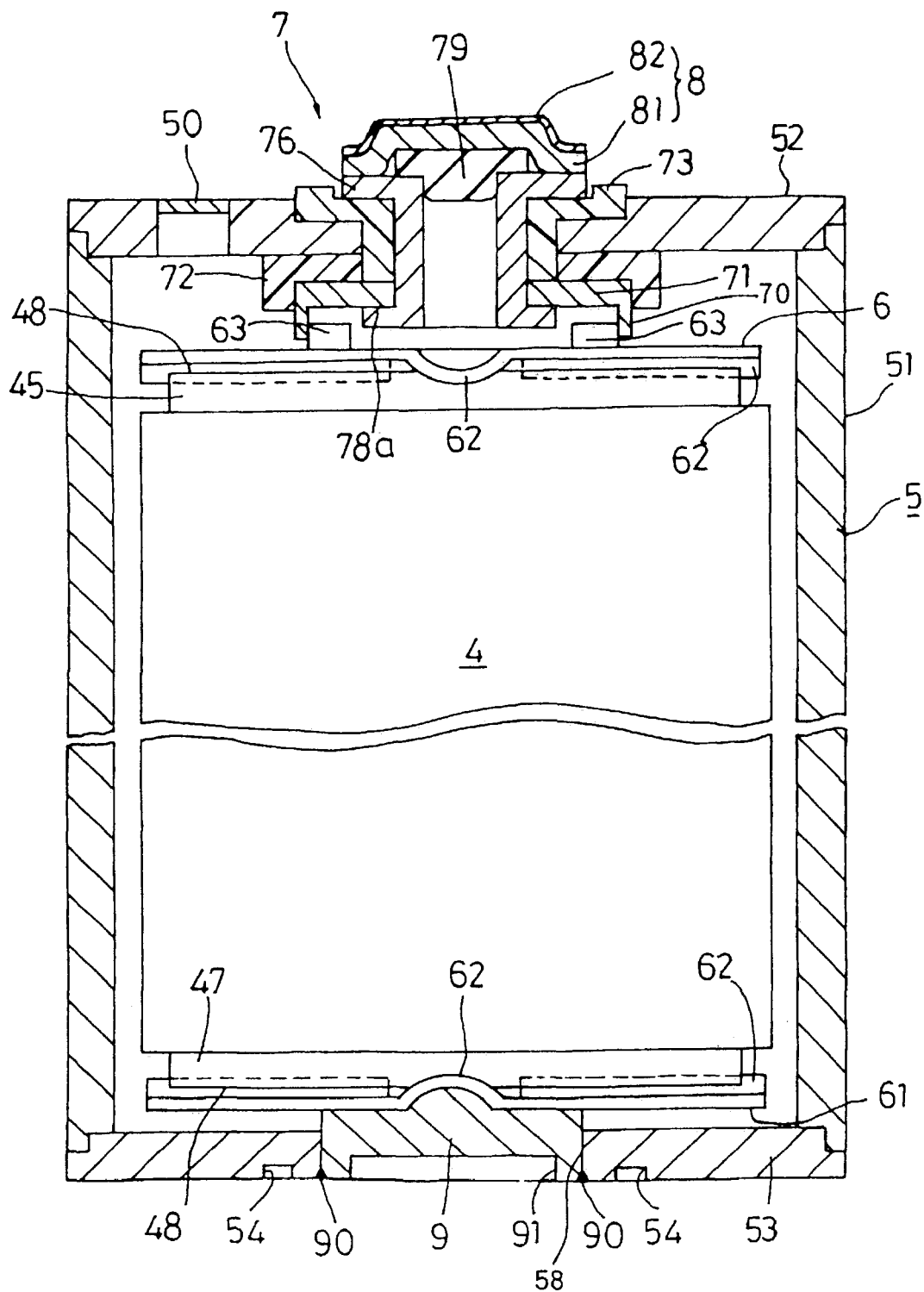
FIG. 1 is a cross sectional view of a lithium ion secondary battery of the present invention.

EXPLANATION OF ELEMENTS 1, 1a: positive electrode can
2: spirally wound electrode unit of prior art battery
4: spirally wound electrode unit
5: battery can
6: current collector plate
7: negative electrode terminal assembly
8: negative electrode terminal
9: terminal connector part
11: sealing plate
12: insulator
13, 13b: negative electrode terminal
14: gas vent valve
21: negative electrode of prior art battery
22: separator of prior art battery
23: positive electrode of prior art battery
31: tab
41: negative electrode
42: separator
43: positive electrode
44: negative electrode active material
45: current collector
46: positive electrode active material 47: current collector
48: current collector edge
50: gas vent valve
51: cylinder
52: upper lid
53: base lid
54: groove
55, 55a: connecting plate
56: aluminum layer
57: nickel layer
58: hole
60: center hole
61: current collector plate
62: arc-shaped protrusion
63, 64: connecting piece
70: flange portion
71: terminal connector
72: first insulator
73: second insulator
76: rivet means
77: disc part
78: cylindrical part
79: rubber plug
81: nickel layer
82: aluminum layer
90: weld
91: circular recessed portion

DETAILED EXPLANATION OF THE INVENTION

Concretely, the coating layer is formed by a cladding or plating on the surface of the electrode terminal.

The electrode can is made of aluminum or aluminum alloy, the negative electrode terminal is made of iron, nickel plated iron, nickel, copper, nickel plated copper or stainless steel, and a layer of aluminum or aluminum alloy is formed as the coating layer on the surface of the negative electrode terminal.

Alternatively, the electrode can is made of iron, nickel plated iron, nickel, copper, nickel plated copper or stainless steel, and the positive electrode terminal is made of aluminum or aluminum alloy, and a layer of iron, nickel plated iron, nickel, copper, nickel plated copper or stainless steel is formed on the surface of the positive electrode terminal as the coating layer.

When the batteries of the present invention are connected in series, the coating layer of the electrode terminal contacts the surface of the other electrode terminal. The coating layer of one of the electrode terminals and the other electrode terminal are made of the same material. Therefore, even when the batteries are used connected in series for a long period of time, electrical corrosion caused by the contacting of different metals will not occur.

Although the coating layer and the terminal on which the coating layer is formed are different metals, the coating layer is bonded to the surface of the electrode terminal, and there is no possibility that water enters between the coating layer and the electrode terminal to cause electrical corrosion after use over a long period of time.

Therefore, the batteries of the present invention can maintain low contact resistance even when they are connected in series.

DESCRIPTION OF PREFERRED EMBODIMENT

The present invention is described below in detail with reference to the drawings.

Entire Structure

As shown in FIG. 1, a battery of the present invention comprises a spirally wound electrode unit (4) housed in a cylindrical battery can (5).

The battery can (5) comprises lids (52), (53) that are secured to openings of cylinder (51) by welding. The base lid (53) forms a positive electrode terminal. A negative electrode terminal assembly (7) is formed on the upper lid (52). A negative electrode terminal (8) which comprises a part of the negative electrode terminal assembly (7) forms a negative electrode terminal portion. Electricity generated in the electrode unit (4) can be taken out of the battery via the positive and negative electrode terminals. A gas vent valve (50) is formed on the upper lid (52) to release pressure when pressure inside the battery increases above a certain level.

Figure 2:
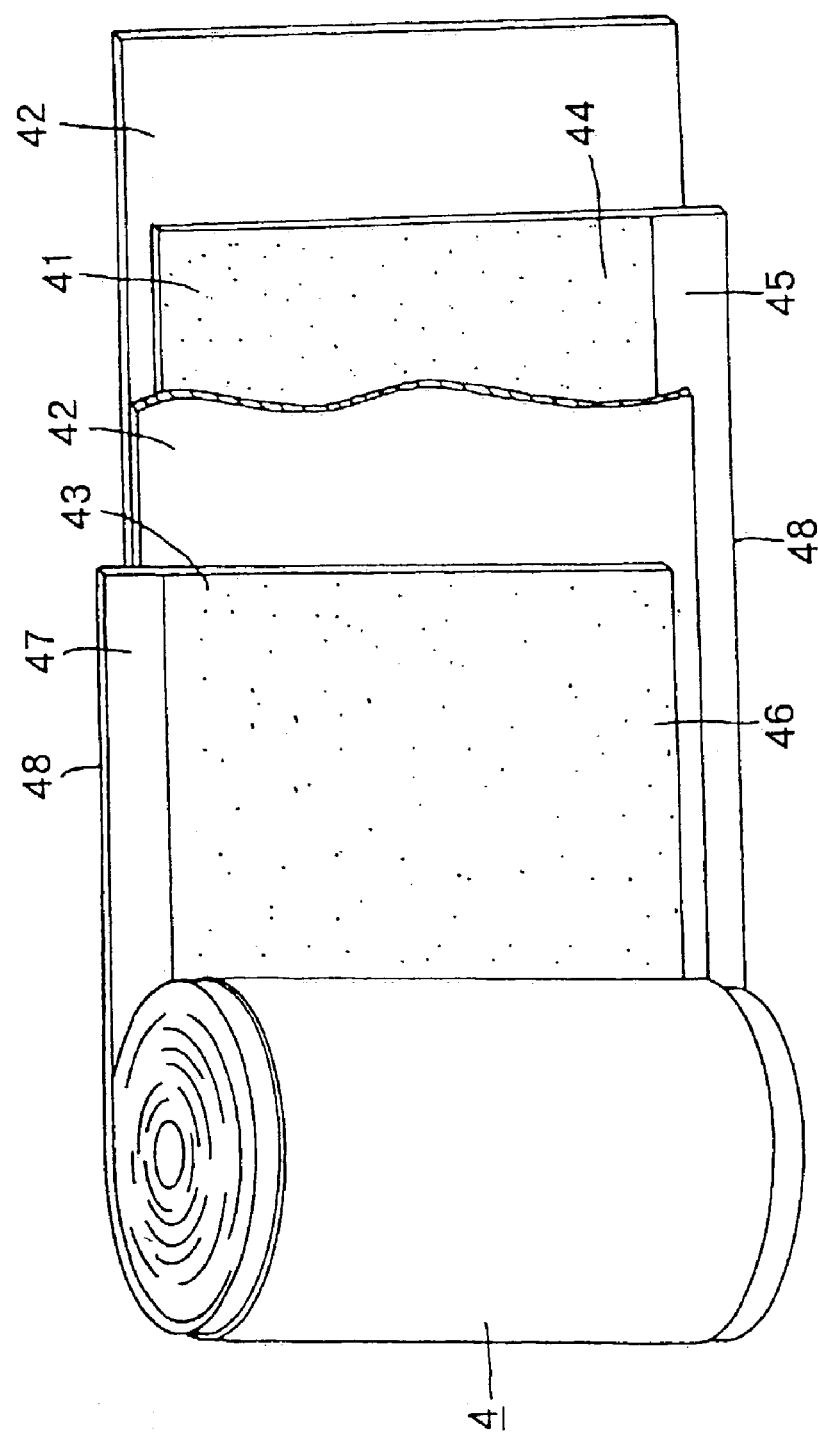
FIG. 2 is a perspective view, partly in development, of a spirally wound electrode unit.

As shown in FIG. 2, the spirally wound electrode unit (4) comprises a strip-like separator (42) sandwiched between a strip-like negative electrode (41) and a strip-like positive electrode (43) and spirally wound. The negative electrode (41) comprises a coating of a negative electrode active material (44) including carbon material coated on both sides of a strip-like current collector (45) made of a copper foil. The positive electrode (43) comprises a positive electrode active material (46), e.g., a lithium composite oxide, coated on both sides of a strip-like current collector (47). The separator (42) is impregnated with a nonaqueous electrolyte.

The negative electrode (41) includes a coated portion where the negative electrode active material (44) is coated and an uncoated portion not having the negative electrode active material (44) coated thereon. The positive electrode (43) also includes a coated portion where the positive electrode active material (46) is coated and an uncoated portion not having the positive electrode active material (46) coated thereon.

The negative electrode (41) and the positive electrode (43) are shifted, or displaced, in the widthwise direction relative to the separator (or axis of the electrode unit) when they are placed on the separator (42) so that the uncoated portions project outside of the edges of the separator (42). Then the separator (42) sandwiched by the negative and positive electrodes is spirally wound to form the spirally wound electrode unit (4). The uncoated portion of the current collector (45) of the negative electrode (41) projects outwardly of the edge (48) of separator (42) at one axial end of the spirally wound electrode unit (4), and the, uncoated portion of the current collector (47) of the positive electrode (43) projects outwardly of the edge (48) of separator (42) at the other axial end of the spirally wound electrode unit (4).

Structure of Current Collector Plates

As shown in FIG. 1, current collector plates (6), (61) are attached by laser beam welding to both ends of the spirally wound electrode unit (4).

Figure 4:
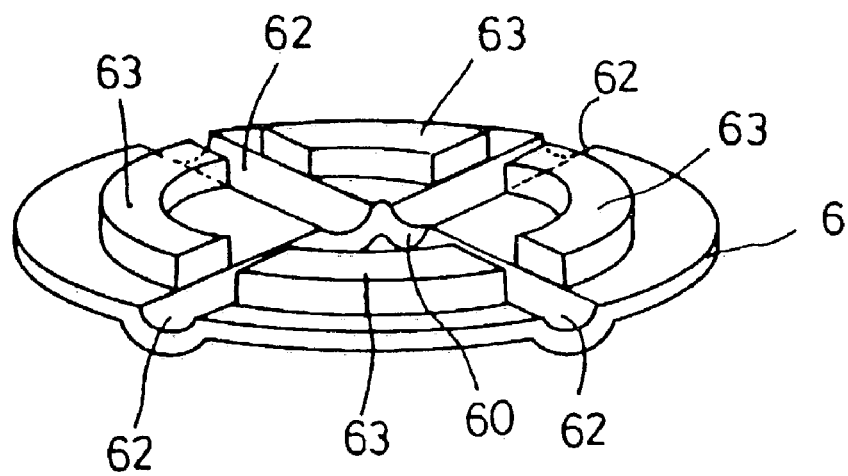
FIG. 4 is a perspective view of a negative electrode current collector plate having connecting pieces.

The current collector plate on the negative electrode side is made of nickel, copper, nickel plated copper or nickel plated iron. As shown in FIG. 4, arc-shaped protrusions (62) (four in FIG. 4) are formed integrally on a circular disk having a center hole (60) and extend radially from the center hole. The protrusions project out the back of the current collector plate, i.e., toward the spirally wound electrode unit (4).

The surface of the current collector plate (6) has four quarter circles each separated by two of the arc-shaped protrusions (62). Four fan shape flat connecting pieces (63) are fixed to the four quarter circles by welding on a line concentrically of the center hole.

Figure 9A:
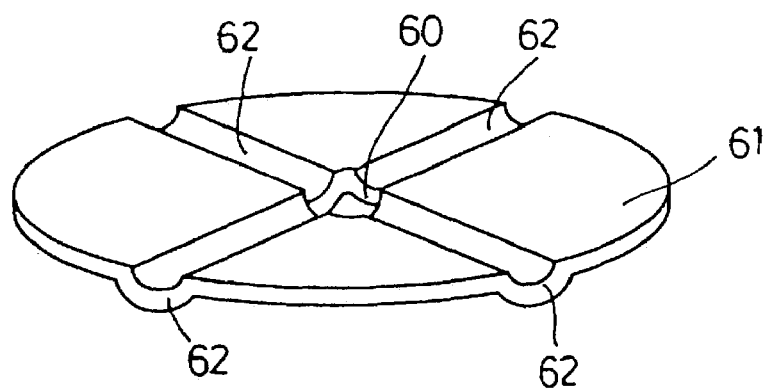
FIGS. 9(a) and (b) are perspective views showing a positive electrode current collector plate and a positive electrode current collector plate having the terminal connector part connected thereto, respectively.

The current collector plate (61) on the positive electrode side is made of aluminum or aluminum alloy. As shown in FIG. 9(*a*), a plurality of arc shape protrusions (62) (four in FIG. 9) are formed integrally on a disk having a center hole (60) and extend radially from the center hole. The protrusions project from the back of the current collector plate (61), i.e., in the direction of of the spirally wound electrode unit (4).

As shown in FIG. 9(*b*), the surface of the current collector plate (61) has a terminal connector part (9) having a circular recessed portion (91). It is also possible to form the terminal connector part (9) integrally on the disk.

In the step of welding the current collector plates (6), (61) onto both ends of the spirally wound electrode unit (4), the current collector plates (6), (61) press against the spirally wound electrode unit (4). Arc-shaped protrusions (62) of the current collector plates (6), (61) press inwardly into the edge (48) of each of the current collectors to form a connection area comprising the cylindrical contact area between the arc shape protrusions (62) and the current collector edge (48). A laser beam is irradiated to the inside of the arc shape protrusions (62) of the current collector plates (6) and (61) to weld the arc-shaped protrusions (62) to the edge (48) of the current collectors of the spirally wound electrode unit (4).

Terminal Connection Structure on Negative Electrode Side

Figure 3:
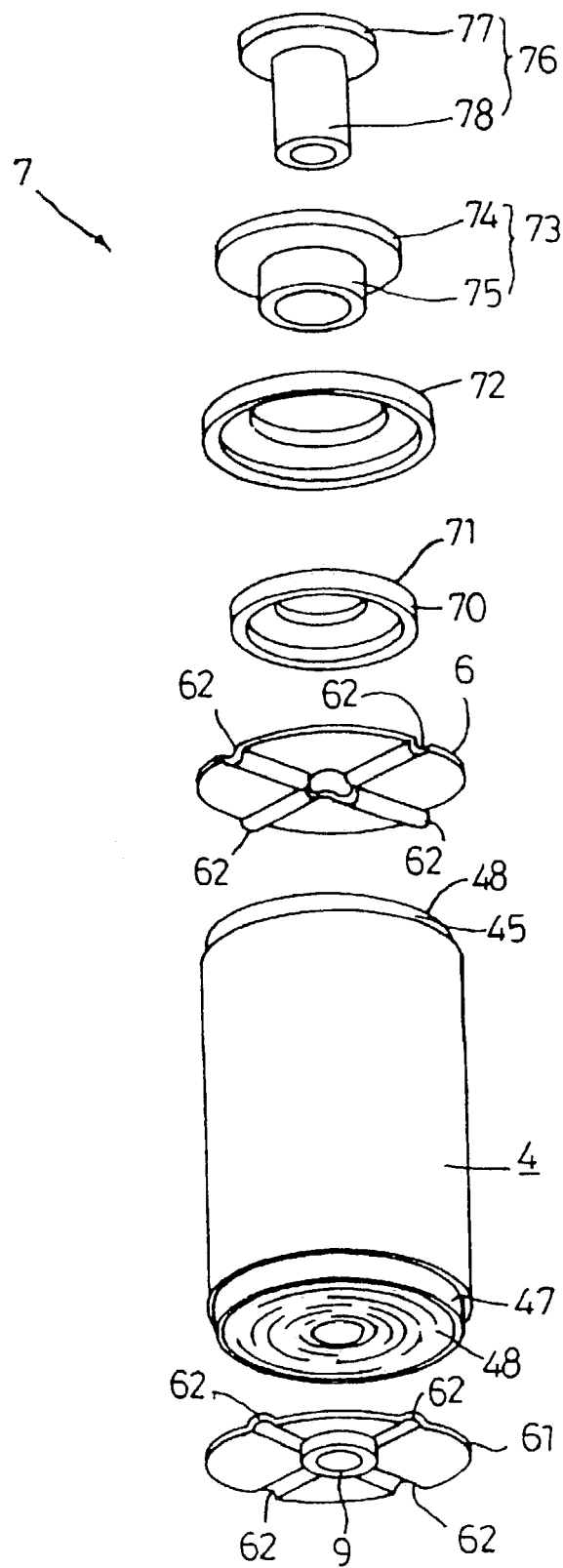
FIG. 3 is an exploded perspective view of a negative electrode terminal assembly.

As shown in FIGS. 1 and 3, the negative electrode terminal assembly (7) comprises a terminal connector (71) having a cylindrical flange portion (70) welded to a plurality of connection pieces (63) on the current collector plate (6), first and second insulators (72), (73) fitted in the center hole of the upper lid (52), a rivet means (76) having a cylindrical shape connecting the terminal connector (71) and insulators (72), (73) to the lid (52), a rubber plug (79) for closing an opening of the rivet means (76), and a negative electrode terminal (8) which covers the rubber plug (79) and is welded on the rivet means (76).

The negative electrode terminal assembly (7) is assembled before an electrolyte is poured in the can except for the rubber plug (79) and the negative electrode terminal (8). After the electrolyte is poured in the can, the rubber plug (79) is mounted on the rivet means (76), and the negative electrode terminal (8) is welded and secured on the rivet means (76).

The terminal connector (71) is made of nickel, nickel plated iron, copper, nickel plated copper or stainless steel.

The insulator (72) is disklike, and is adhered under pressure onto the back of the lid (52). The insulator (73) is cylindrical, and is adhered under pressure along the inside periphery of the center hole of the lid (52). The insulators maintain an airtight seal between the lid (52) and the negative electrode terminal assembly, and are made of polyethylene (PE); polypropylene (PP); nylon; a fluoroplastic resin such as perfluoroalkoxy (PFA), poly(tetrafluoroethylene) (PTFE); polyphenylene sulfide (PPS) or polyetheretherketone (PEEK).

Figure 6:
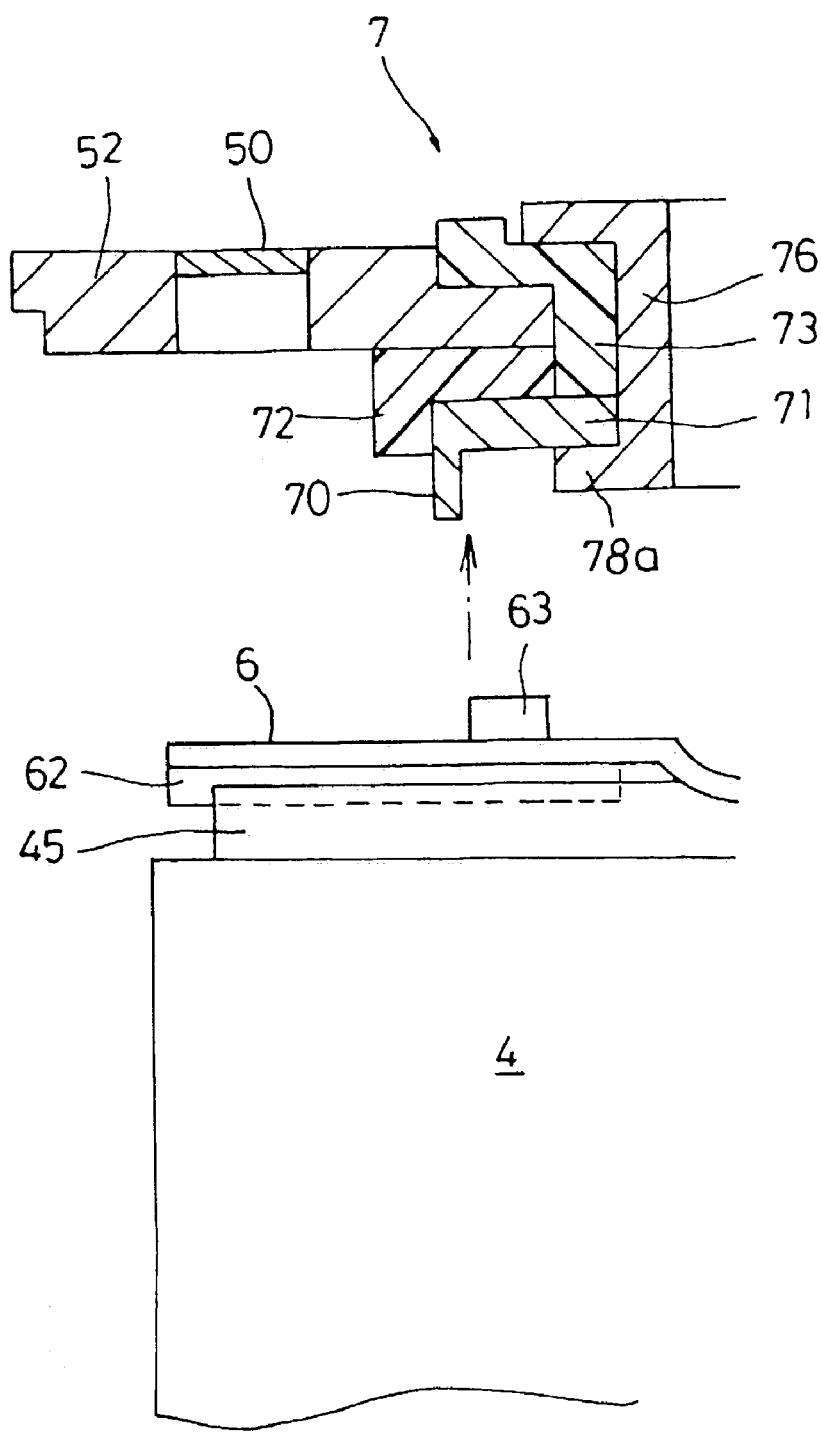
FIG. 6 is a partial view showing the step of connecting the negative electrode current collector plate to the negative electrode terminal assembly.

A material of the rivet means (76) is chosen from nickel plated iron, nickel, copper, nickel plated copper or soft iron. As shown in FIG. 3, a projecting cylindrical part (78) is formed on a back of a disc part (77) of rivet means (76). As shown in FIG. 6, the cylindrical part (78) of the rivet means (76) is inserted into center openings of the terminal connector (71) and insulators (72), (73) which are assembled on the lid (52), and bottom part (78*a*) of the cylindrical part (78) is caulked to secure the terminal connector (71) and insulators (72), (73) to the lid (52).

The negative electrode terminal (8) has a clad structure consisting of a nickel layer (81) having a thickness of about 0.2 mm and an aluminum layer (82) having a thickness of about 30 µm. Cladding can be performed by a common method such as rolling under reduced pressure to bond the two layers, or with heat. A method in which heating is applied after rolling to form a diffusion layer at the interface between two layers can also be used.

The nickel layer (81) and aluminum layer (82) are uniformly bonded by the process. Therefore, there is no possibility that water or moisture penetrates into the interface between the layers and, thus, electric corrosion caused by contacting of different metals is prevented.

A method for bonding the layers is not limited to cladding. Aluminum plating onto the surface of the nickel layer (81) is also an acceptable method to form the aluminum layer (82).

Figure 7:
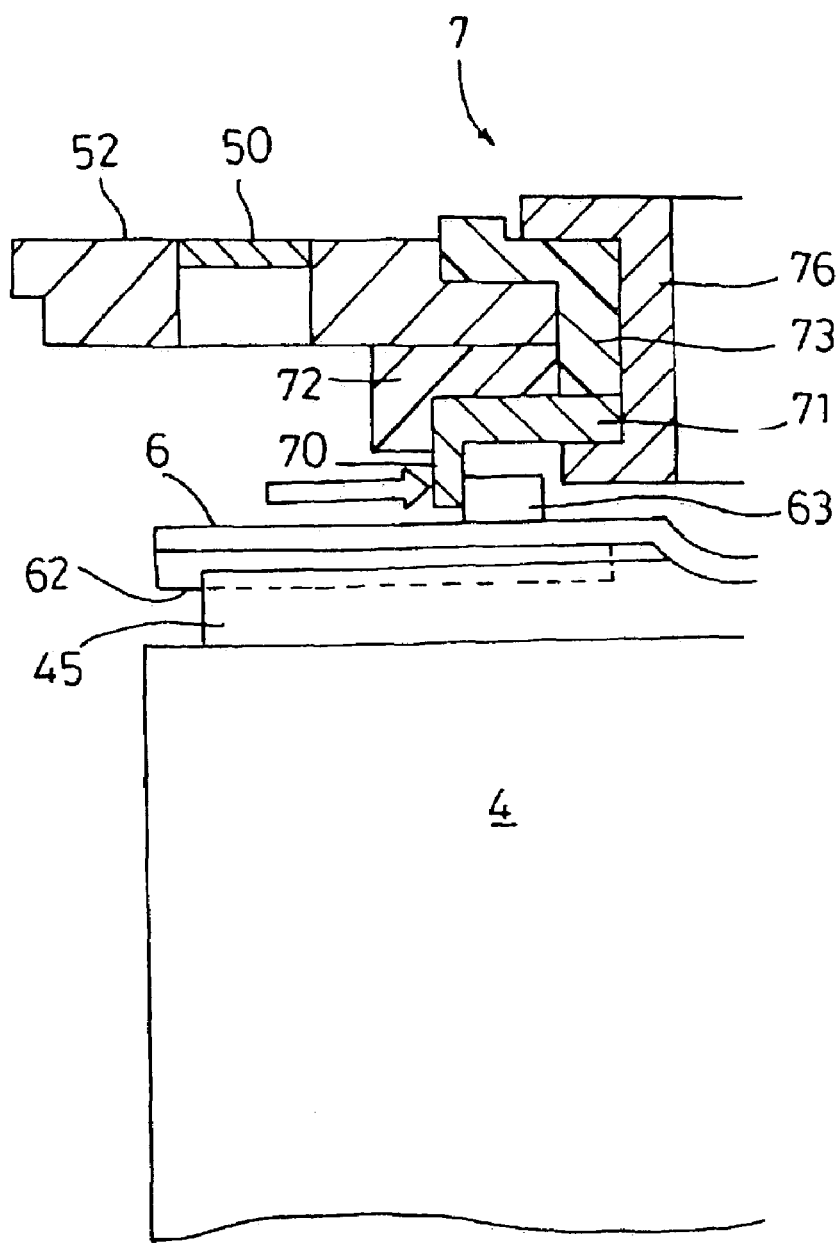
FIG. 7 is a partial view of a portion of the negative electrode current collector plate connected to the negative electrode terminal assembly.
Figure 8:
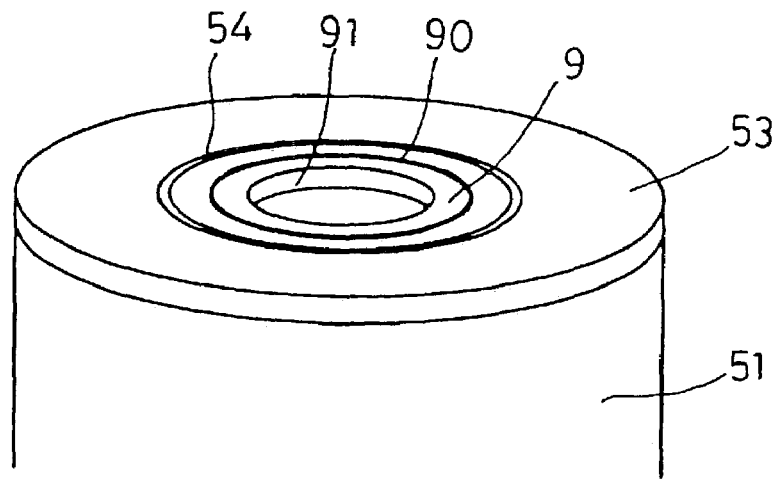
FIG. 8 is a perspective view showing a base lid welded to a terminal connector part.

A plurality of connecting pieces (63) formed on the current collector plate (6) which is on the negative electrode of the spirally wound electrode unit (4) can be adhered to the flange portion,(70) of the terminal connector,(71). As shown in FIG. 6, the negative electrode terminal assembly (7) is assembled onto the lid (52), and after the current collector plate (6) having the connecting pieces (63) is fixed onto the spirally wound electrode unit (4), the inner peripheral wall of the flange portion (70) of the terminal connector (71) and the outer peripheral wall of the connecting pieces (63) of the current collector plate (6), as shown in FIG. 7, are attached together and irradiated with a laser beam outside of the flange portion (70) of the terminal connector (71) to weld the flange portion (70) of the terminal connector (71) to the connecting pieces (63) of the current collector plate (6).

Figure 5:
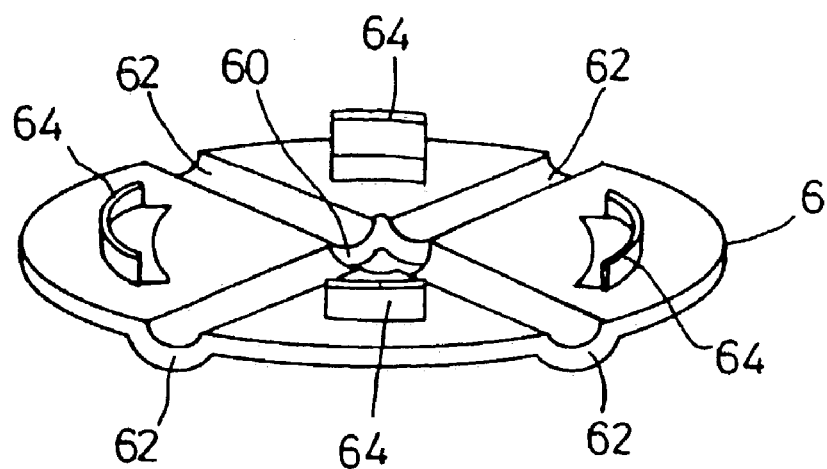
FIG. 5 is a perspective view of a negative electrode current collector plate having connecting pieces of a different shape.

A plurality of connecting pieces (63) can be formed integrally as one piece. The connecting pieces (63) can also be arc-shaped instead of fan shaped as shown in FIG. 5 to form a cylindrical portion to attach to the flange portion (70) of the terminal connector (71). The arc-shaped connecting pieces (64) can be formed by carving the current collector plate (6).

Terminal Connection Structure of Positive Electrode Side

As shown in FIG. 1, the terminal connector part (9) secured on the current-collector plate (61) on the positive electrode side of the spirally wound electrode unit (4) is connected to the base lid (53) of the battery can (5).

Figure 10:
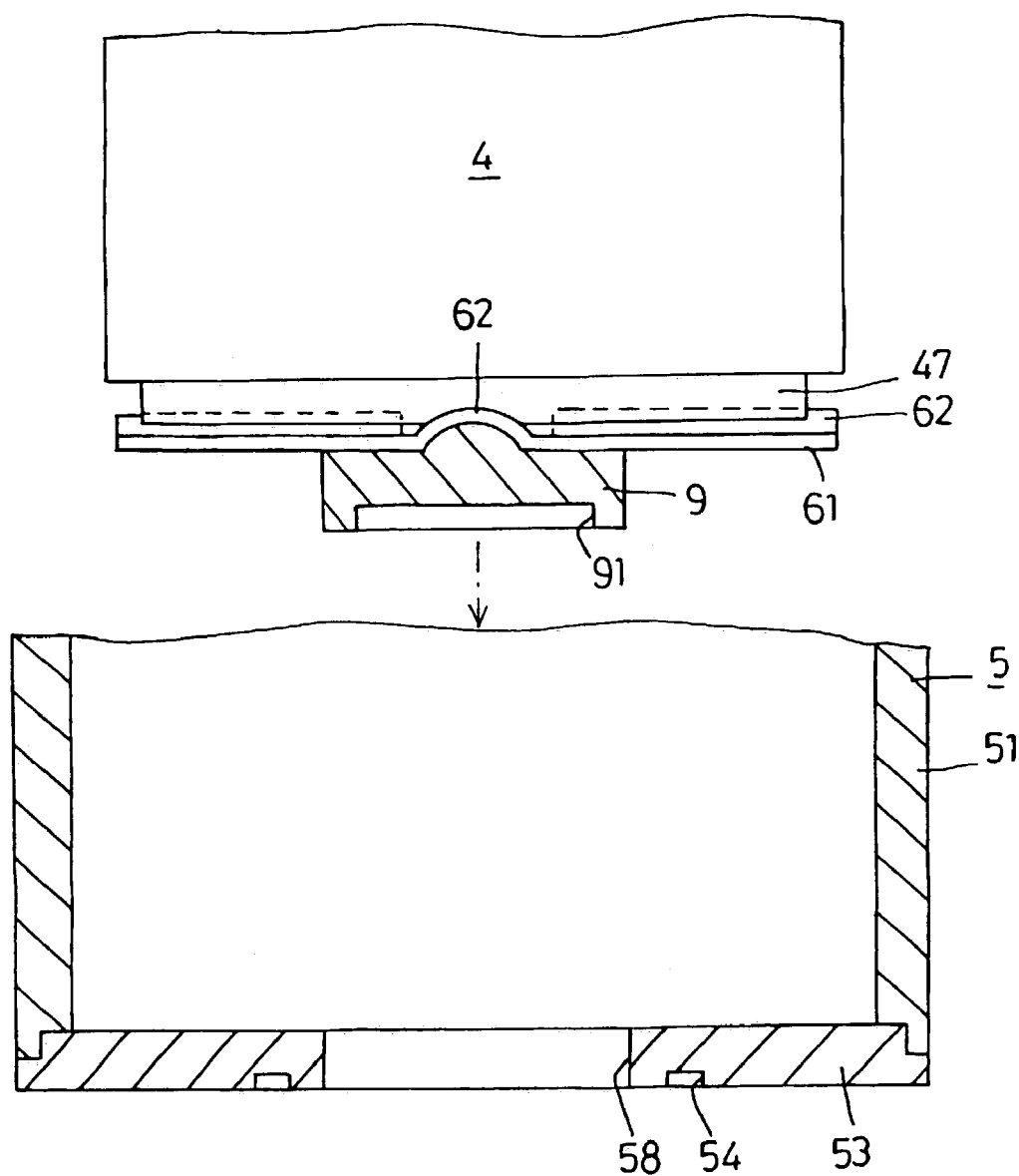
FIG. 10 is a partial view illustrating the step of connecting the terminal connector part to a battery can.

As shown in FIG. 10, the base lid (53) is formed in the center with a hole (58) having the same inner circumference as the outer circumference of the terminal connector part (9). The terminal connector part (9) is inserted into the center hole (58) of the base lid (53), then, as shown in FIG. 1, the surfaces of the lid (53) and the terminal connector part (9) are made flush and are irradiated with a laser beam from outside of the lid (53) along the circumference to weld the terminal connector part (9) to the lid (53)

In the above explained terminal connection structure, the recessed portion (91) forms a wall inside of weld (90). A groove (54) is also formed along the circumference on the surface of the lid (53) to create a wall outside of weld (90).

The weld (90) is sandwiched by the two walls to inhibit heat radiation during laser beam welding. This prevents a sudden temperature drop at the weld (90) which is a cause of cracking.

Figure 11:
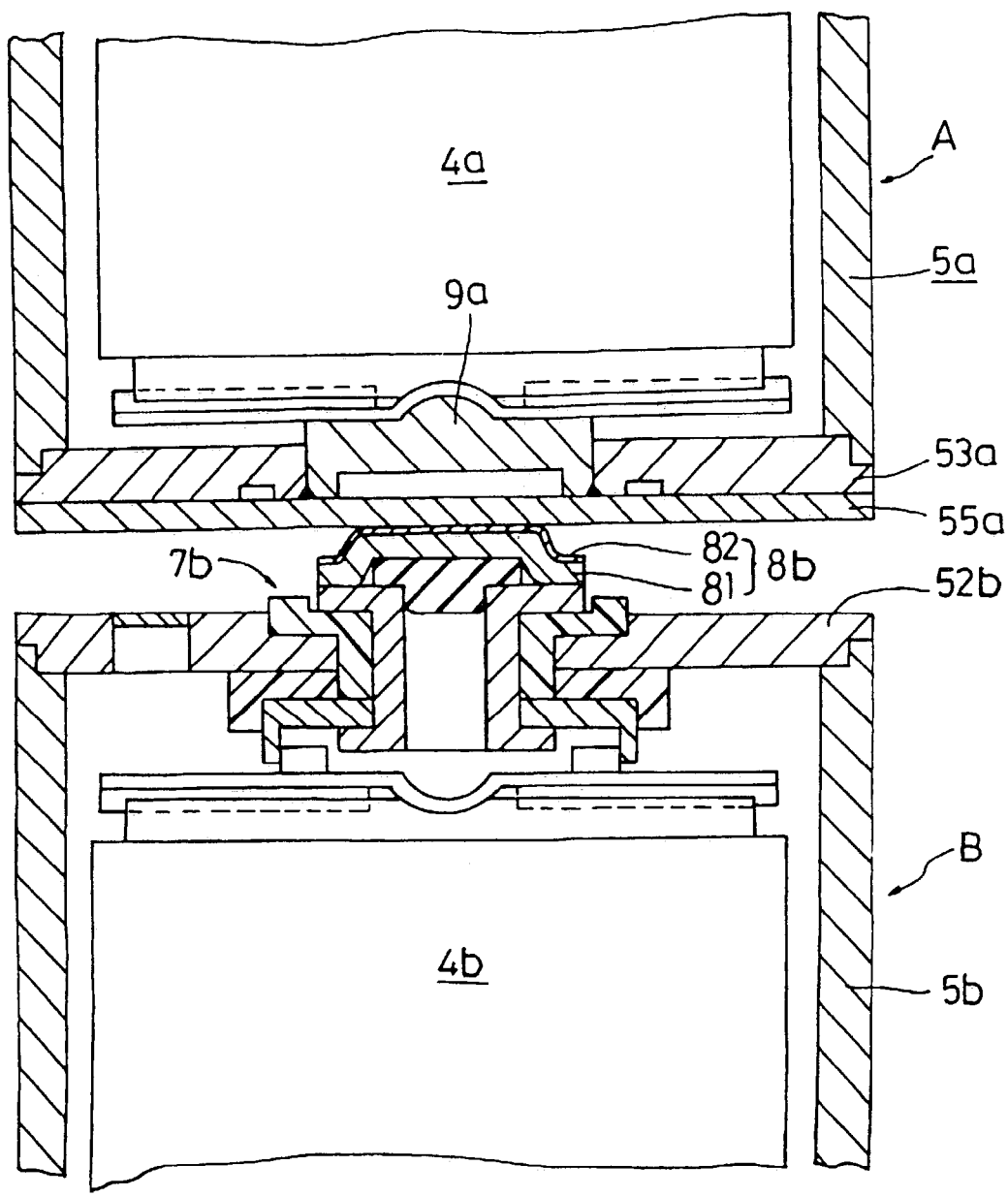
FIG. 11 is a partial view of batteries of the invention connected in series.
Figure 12:
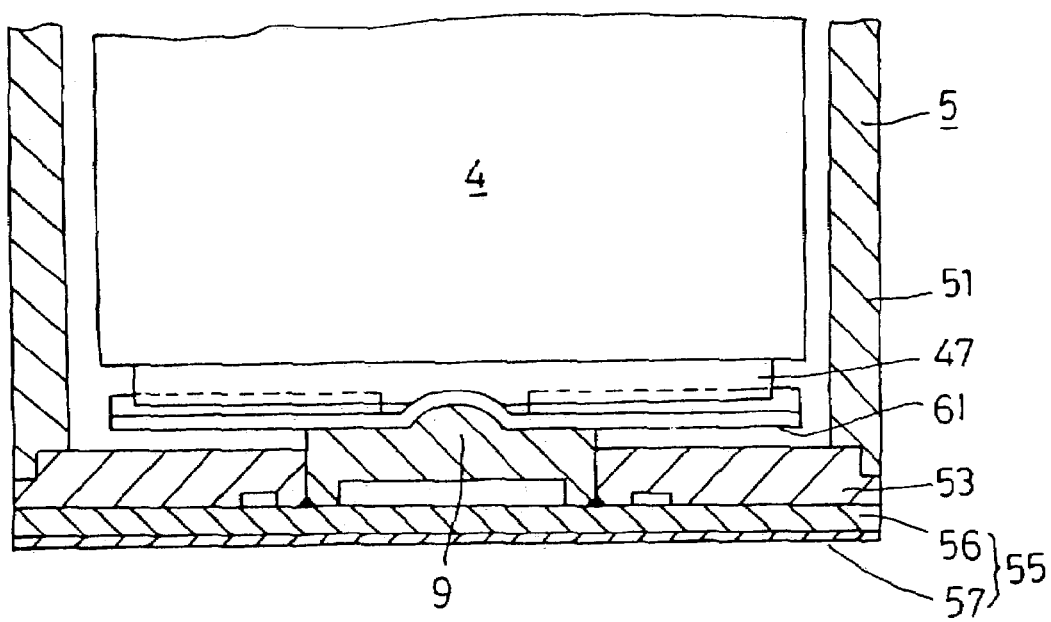
FIG. 12 is a partial view illustrating the construction of a connecting plate having a clad structure secured on the lid of a battery can.
Figure 13:
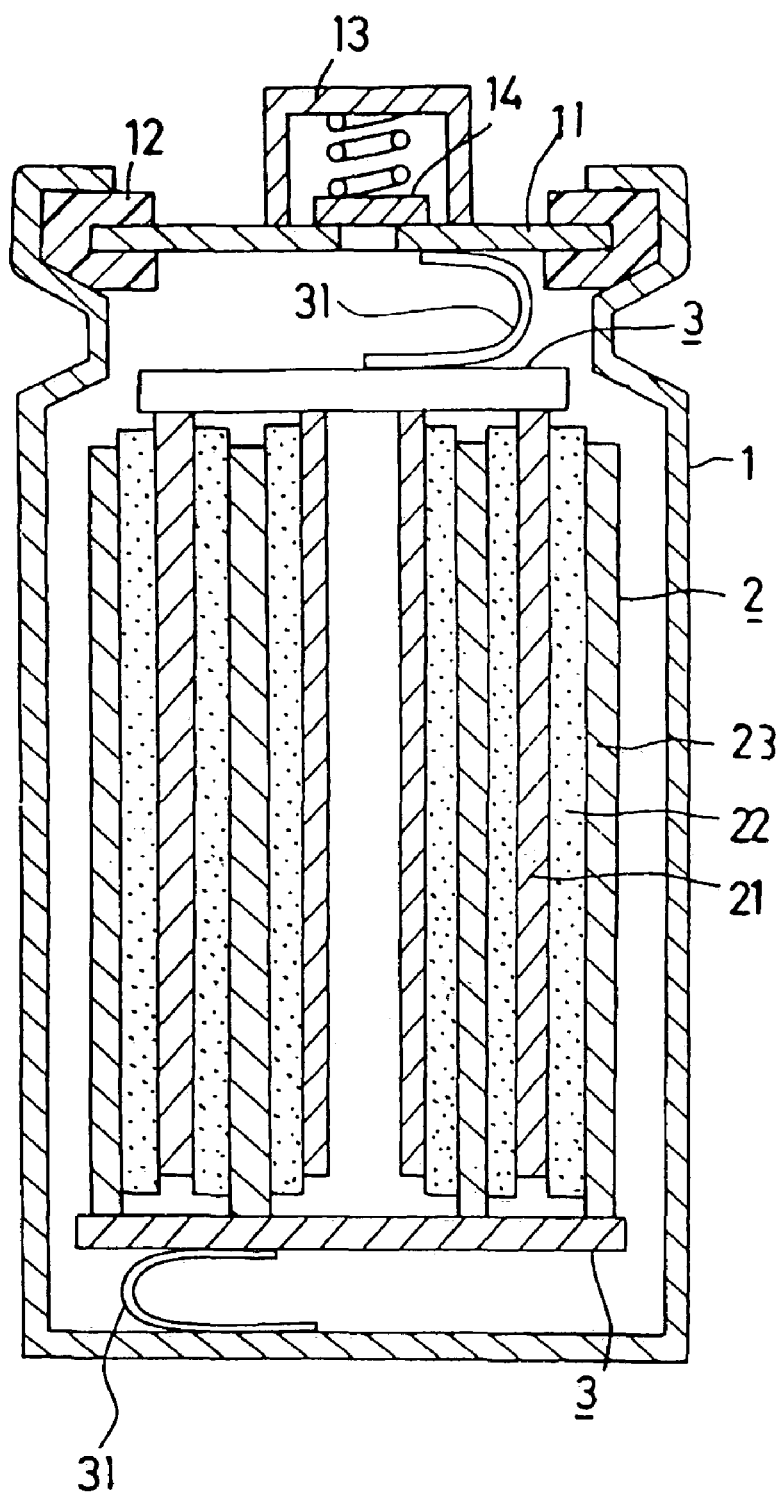
FIG. 13 is a cross sectional view of a conventional lithium ion secondary battery.
Figure 14:
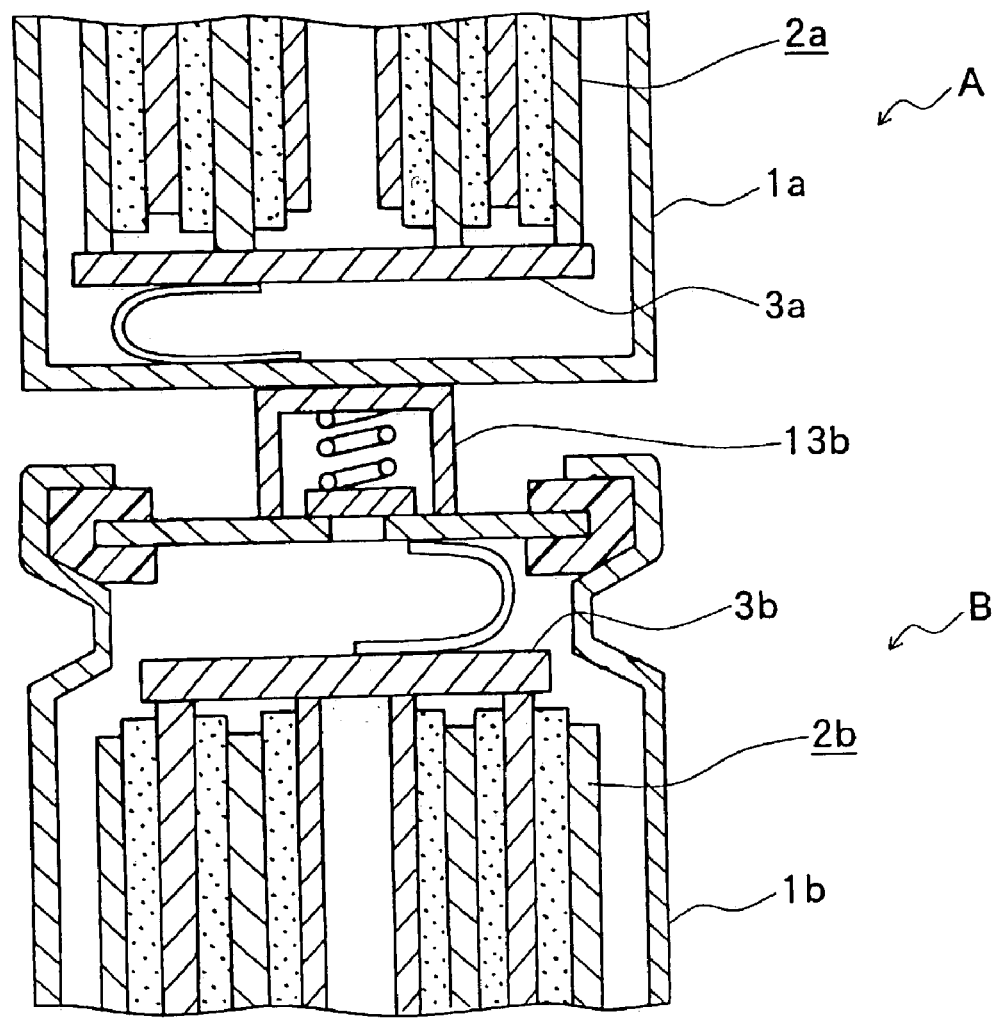
FIG. 14 is a cross sectional view of conventional batteries connected in series.

If necessary, a connecting plate (55*a*) of aluminum can be welded on the surface of the case lid (53) by laser beam welding to form a positive electrode terminal portion having a flat surface as shown in FIG. 11.

As shown in FIG. 11, this structure make it possible to have a definite and stable contact between a negative electrode terminal (8b) of a battery B and the connecting assistant plate (55a) which is a positive electrode terminal of battery A when they are connected in series.

Assembly of Battery

Figure 9B:
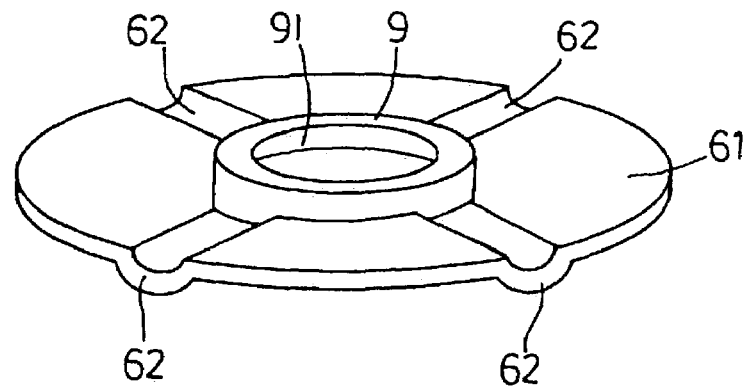

After the spirally wound electrode unit (4) as shown in FIG. 2 is prepared, the current collector plate (6) as shown in FIG. 4 is welded to an edge of the negative electrode of the spirally wound electrode unit (4) by laser beam welding and the current collector plate (61) as shown in FIG. 9(b) is welded to an edge of the positive electrode of the spirally wound electrode unit (4) by laser beam welding.

Then, as shown in FIGS. 6 and 7, the negative electrode terminal assembly (7) is assembled except for the rubber plug (79) and negative electrode terminal (8), the connecting pieces (63) on the current collector plate (6) are welded to the flange (70) of the terminal connector (71). A laser beam is irradiated outside the flange (70) for welding.

As shown in FIG. 10, the terminal connector part (9) is inserted into the center hole (58) of the lid (53) to place the surface of the terminal connector part (9) flush with the lid (53). The area of contact between the terminal connector part (9) and lid (53) is welded from outside the battery can (5).

Finally, the electrolyte is poured into the battery can (5) from the center hole of the rivet means (76), the rubber plug (79) is inserted in the opening of the rivet means (76), and then the negative electrode terminal (8) is welded on the rivet means (76) to seal the battery can (5) as shown in FIG. 1.

When lithium ion secondary batteries A and B of the present invention are connected in series, the aluminum layer of the negative electrode terminal (8b) contacts the connecting plate (55) made of aluminum of battery A to prevent electric corrosion caused by contact of different metals.

Even if a battery does not include the connecting plate (55), the negative electrode terminal (8b) of the battery B contacts the lid (53a) made of aluminum or the terminal connector part (9) made of aluminum. Therefore, electrical corrosion caused by the contacting of different metals does not occur.

Even if the battery has the connecting assistant plate (55) comprising a clad structure of an aluminum layer (56) and a nickel layer (57) instead of the negative electrode terminal (8) comprising the clad structure of a nickel layer (81) and an aluminum layer (82), the same metals contact each other and electrical corrosion caused by contact of different metals does not occur.

The lithium ion secondary battery of the present invention has a structure that the spirally wound electrode unit (4) connects the negative electrode terminal assembly (7), and the connecting pieces (63) secured on the negative electrode current collector plate (6) are connected directly to the flange (70) of the terminal connector (71) without a tab which is conventionally used to improve productivity and to reduce the length of the current path between the spirally wound electrode unit (4) and the negative electrode terminal (8), to reduce deadspace inside the battery can (5) and to reduce internal resistance.

The lithium ion secondary battery of the present invention has a structure that, to connect the spirally wound electrode unit (4) to the lid (53), which is the positive electrode terminal portion, the terminal connector part (9) is inserted into the central hole (58) formed on the lid (53) to connect the terminal connector part (9) directly to the lid (53) without a tab which is conventionally used after a negative electrode terminal assembly (7) is connected to a spirally wound electrode unit (4). This structure makes it possible to apply laser beam welding from outside of the can to improve productivity and to reduce the length of the current path between the spirally wound electrode unit (4) and the negative electrode terminal (8), to reduce deadspace inside the battery can (5) and to reduce internal resistance.

It is of course understood that the present invention is not limited to the embodiments explained above and can be modified within the spirit and scope of the appended claims. For example, polarity of the negative and positive electrodes can be reversed, the spirally wound electrode unit can be housed upside down in the battery can (5) and the negative electrode terminal (8) is changed to the positive electrode terminal and the negative electrode terminal is formed by the battery can (5).

What is claimed is:

1. A battery comprising an electrode unit which is a power generation element housed in a cylindrical battery can, and in which electricity can be taken out from a pair of negative and positive electrode terminals which are exposed outside the can, wherein a coating layer consisting of the same material of which one of the negative and positive electrode terminals is made is formed on a surface of the other of the negative and positive electrode terminals and the coating layer is formed by a cladding connection or plating on the surface of said other electrode terminal.

2. The battery according to claim 1, wherein the battery can consists of aluminum or aluminum alloy, the negative electrode terminal consists of a material selected from the group consisting of iron, nickel coated iron, nickel, copper, nickel coated copper and stainless steel, and the surface of the negative electrode terminal has a coating layer of the aluminum or aluminum alloy of which the battery can is made.

3. The battery according to claim 1, wherein the battery can consists of a material selected from the group consisting of iron, nickel plated iron, nickel, copper, nickel plated copper and stainless steel, and the positive electrode terminal consists of aluminum or aluminum alloy, and the surface of the positive electrode terminal has a coating layer of the iron, nickel plated iron, nickel, copper, nickel plated copper or stainless steel of which the battery can is made.

4. A combination of at least two batteries connected in series in which each battery is the same and comprises an electrode unit which is a power generation element housed in a cylindrical battery can, and in which electricity can be taken out from a pair of negative and positive electrode terminals which are exposed outside the can, wherein a coating layer consisting of the same material of which one of the negative and positive electrode terminals is made is formed on a surface of the other of the negative and positive electrode terminals, and further wherein the at least two batteries connected in series are connected so that the negative electrode terminal of one battery directly contacts the positive electrode terminal of the other battery.

5. The combination of at least two batteries according to claim 4, wherein the battery can of each battery consists of aluminum or an aluminum alloy, the negative electrode terminal consists of a material selected from the group conisisting of iron, nickel coated iron, nickel, copper, nickel coated copper and stainless steel, and the surface of the negative electrode terminal has a coating layer of the aluminum or aluminum alloy of which the battery can is made.

6. The combination of at least two batteries according to claim 4, wherein the battery can of each battery consists of a material selected from the group consisting of iron, nickel plated iron, nickel, copper, nickel plated copper and stainless steel, and the positive electrode terminal consists of aluminum or aluminum alloy, and the surface of the positive electrode terminal has a coating layer of the iron, nickel plated iron, nickel, copper, nickel plated copper or stainless steel of which the battery can is made.

7. The combination of at least two batteries according to claim 4, wherein the coating layer is formed by a cladding connection or plating on the surface of said other electrode terminal.

* * * * *